(12) United States Patent
Martinez

(10) Patent No.: US 10,859,669 B2
(45) Date of Patent: Dec. 8, 2020

(54) HIDDEN IDENTIFICATION TAGS FOR OBJECTS INCLUDING AUTOMOBILES

(71) Applicant: Benjamin Martinez, Alexandria, LA (US)

(72) Inventor: Benjamin Martinez, Alexandria, LA (US)

( * ) Notice: Subject to any disclaimer, the term of this patent is extended or adjusted under 35 U.S.C. 154(b) by 218 days.

(21) Appl. No.: 15/894,927

(22) Filed: Feb. 12, 2018

(65) Prior Publication Data

US 2019/0178978 A1  Jun. 13, 2019

Related U.S. Application Data

(60) Provisional application No. 62/431,994, filed on Dec. 9, 2016.

(51) Int. Cl.
| | |
|---|---|
| *G01S 5/02* | (2010.01) |
| *B64G 3/00* | (2006.01) |
| *G06K 19/077* | (2006.01) |
| *H04W 4/80* | (2018.01) |
| *H04W 4/029* | (2018.01) |

(Continued)

(52) U.S. Cl.
CPC .............. *G01S 5/0294* (2013.01); *B64G 3/00* (2013.01); *G06K 19/0723* (2013.01); *G06K 19/07758* (2013.01); *H04W 4/029* (2018.02); *H04W 4/80* (2018.02); *B60R 25/102* (2013.01); *B60R 2325/105* (2013.01); *H04W 4/70* (2018.02)

(58) Field of Classification Search
CPC ......... H04W 4/029; H04W 4/02; H04W 8/22; H04W 8/24; H04W 4/40; H04W 4/80; H04W 4/70; G01S 19/13; G01S 13/46; G01S 2013/468; G01S 13/931; G01S 5/0226; G01S 5/04; G01S 5/0294; G08G 1/123; B64G 1/546; B64G 1/646; B64G 2004/005; B64G 4/00; B64G 3/00; B60R 25/102; B60R 2325/105; G06K 19/0723; G06K 19/07758

See application file for complete search history.

(56) References Cited

U.S. PATENT DOCUMENTS 5,003,317 A * 3/1991 Gray ..................... G01S 5/0009
                                                             342/457
5,105,179 A   4/1992 Smith
(Continued)

OTHER PUBLICATIONS

Soumya Datta, https://pdfs.semanticscholar.org/427a/0fadfe32731255b498f14896af71c36fe50e.pdf.
http://www.etsi.org/deliver/etsi_tr/101500_101599/101584/02.01.01_60/tr_101584v020101p.pdf.

*Primary Examiner* — Olumide Ajibade Akonai

(57) ABSTRACT

The invention comprises a system of using small, hidden, machine-to-machine (M2M) chips to track automobiles through the radio emissions of the chips, and to use M2M chips as a defense against theft generally, by tracking potentially stolen items through the radio emissions of M2M chips. Users can monitor potential theft of the different parts of an automobile because the chips embedded into the automobile components will be constantly communicating with each other. Spacecraft and other near-earth objects, and drones, can also be tracked by M2M chips, that can be designed in a manner that makes them extremely difficult to find. The M2M chips can be designed in numerous different shapes, and use very little power. Some of the M2M chips are silicon wafer chips with small logic gates.

14 Claims, 10 Drawing Sheets

(51) Int. Cl.
*G06K 19/07* (2006.01)
*B60R 25/102* (2013.01)
*H04W 4/70* (2018.01)

(56) References Cited

U.S. PATENT DOCUMENTS

| | | | |
|---|---|---|---|
| 5,657,008 | A | 8/1997 | Bantli |
| 6,404,327 | B1 | 6/2002 | Naddeo |
| 6,437,690 | B1 | 8/2002 | Okezie |
| 7,096,102 | B1 | 8/2006 | Parker |
| 8,917,178 | B2 | 12/2014 | Batra |
| 9,165,457 | B1 * | 10/2015 | Bertagnolli, Jr. ........ H04Q 9/00 |
| 9,663,043 | B2 | 5/2017 | Belugu |
| 9,807,556 | B2 | 10/2017 | Holland |
| 2002/0044069 | A1 | 4/2002 | Jenkinson |
| 2004/0189493 | A1 | 9/2004 | Estus et al. |
| 2005/0088320 | A1 | 4/2005 | Kovach |
| 2005/0094851 | A1 * | 5/2005 | Bodin .................. G05D 1/0044 382/106 |
| 2007/0171077 | A1 | 7/2007 | Kawarizadeh |
| 2009/0072997 | A1 * | 3/2009 | Shrum, Jr. ............. G08G 1/205 340/905 |
| 2015/0127192 | A1 * | 5/2015 | Phatak ................ B60R 16/0231 701/2 |
| 2016/0189514 | A1 * | 6/2016 | Todasco ................ G08B 21/10 340/8.1 |
| 2016/0232794 | A1 * | 8/2016 | Hafeez ................ G08G 5/0043 |
| 2017/0124884 | A1 * | 5/2017 | Shaw .................... G08G 5/0082 |
| 2017/0234966 | A1 * | 8/2017 | Naguib .................... G01S 5/22 367/117 |
| 2018/0120829 | A1 * | 5/2018 | Price ....................... B64C 27/20 |
| 2019/0003840 | A1 * | 1/2019 | Song .................... B64C 39/024 |

\* cited by examiner

HIDDEN IDENTIFICATION TAGS FOR OBJECTS INCLUDING AUTOMOBILES

DESCRIPTION OF THE RELATED ART

U.S. Pat. No. 8,917,178 by Batra includes a system of RFID tags that are attached to vehicles. Insurance companies can use it, and the RFID tags can store several different kinds of information about the vehicles. This is different from the current invention, because the current invention uses M2M chips, which have a different structure from RFID chips, and are capable of more types of communication than RFID chips. The M2M chips (particularly silicon wafer chips) also can be shaped in many different ways from RFID chips, which means that the current invention can include M2M chips that are placed in locations where RFID chips cannot be placed, and have functions that the RFID chips of Batra's invention do not have. M2M chips also communicate in different ways from RFID chips.

U.S. Pat. No. 6,437,690 by Okezie discloses "An apparatus comprising an identification device; wherein the identification includes electronic memory which contains insurance information about a motor vehicle; wherein the identification device can be attached to the motor vehicle; and wherein the insurance information in the identification device can be detected by a detection device; and wherein the identification device automatically moves to a position outside the motor vehicle when the motor vehicle is started, and automatically retracts to a position inside the motor vehicle when the motor vehicle is shut off." The patent specifically discusses RFID chips, and only RFID chips, as the identification devices. The present invention is different from Okezie's invention, because it involves M2M chips, and these chips (especially carbon wafer chips) are utilized in ways that the RFID chips of Okezie's invention cannot be utilized.

U.S. Pat. No. 5,105,179 by Smith discloses electronic license plates, which electronically display information such as license numbers. The present invention utilizes M2M chips, which have functions above and beyond the functions of the electronic license plates of Smith's invention.

U.S. Pat. No. 5,657,008 by Bantli describes an electronic license plate system that includes identification for the license plates. The patent does not describe any form or nature for the identification system, though, so it does not disclose the use of M2M chips for the identification system. The M2M chips of the present invention can perform functions that the electronic license plate of Bantli's invention cannot perform. The chips of the present invention can also be designed so that law enforcement can detect whether a certain type of license plate belongs on a certain kind of automobile, which will help law enforcement, especially the U.S. border patrol, to stop smugglers and criminals more easily, because they will be able to detect occasions when a smuggler has placed a stolen license plate on a different automobile.

U.S. Pat. No. 6,404,327 by Naddeo discusses an electronic license plate system, with a digital display that includes information about the license number and whether certain criminal activity has happened. Again, the M2M chips of the present invention can perform functions that the electronic license plate system of Naddeo cannot perform.

Patent Application 2004/0189493 by Estus et al. discusses at claim 2 "The vehicle tracking system of claim 1 wherein the license plate is constructed with embedded ID electronics which provide a unique electronic signature to the license plate, with security features to detect tampering." However, the only tracking chips mentioned in the patent application are RFID chips. M2M chips can be placed in locations where RFID chips cannot be placed, which creates a clear distinction between the present invention and Estus's invention. The M2M chips of the present invention can also be hidden in several locations in a license plate and/or the other areas of an automobile, so they will be harder to remove than RFID chips.

Patent Application 2007/0171077 by Kawarizadeh discloses a small, planar, license plate, with an RFID tag, and an electrical power supply that sends power to the RFID tag. Again, the M2M chips of the present invention allow a much greater range of functions than the invention of Kawarizadeh. The M2M chips of the present invention, for example, can be designed to use very little power, so they will not need an electrical power supply.

Patent Application 2005/0088320 by Kovach describes a group of RFID tags affixed to vehicles, and a monitor system, connected with the RFID tag. This system is used for parking enforcement. The present invention proposes a much greater range of functions than Kovach's invention.

Patent Application 2002/0044069 by Jenkinson discloses a vehicle registration tag with a microchip, that tells law enforcement whether the vehicle's registration has expired. The M2M chips of the present invention can be used for a wider range of uses than Jenkinson's invention.

RFID stands for "Radio Frequency Identification". An RFID system consists of a tag, which is made up of a microchip with an antenna, and an interrogator or reader with an antenna. The reader sends out electromagnetic waves. The tag antenna is tuned to receive these waves. A passive RFID tag draws power from a field created by the reader and uses it to power the microchip's circuits. The chip then modulates the waves that the tag sends back to the reader and the reader converts the new waves into digital data.

An active RFID chip has its own power source to power the microchip's circuit. Active RFID chips also generally broadcast their presence through radio waves. An RFID chip includes an integrated circuit and an antenna.

In every RFID tag, data is stored within a tag's microchip, the tag's antenna then receives electromagnetic energy from the RFID reader's antenna, and the tag sends radio waves back to the reader. Finally, the radar picks up the tag's radio waves and creates meaningful, simplified data.

RFID belongs to a group of technologies referred to as Automatic Identification and Data Capture (AIDC). AIDC methods automatically identify objects, collect data about them, and enter those data directly into computer systems with little or no human intervention.

NFC is a specialized subset within the family of RFID technology. Specifically, NFC is a branch of High-Frequency (HF) RFID, and both operate at the 13.56 MHz frequency.

RFID systems can use a cellular system called Time Division Multiple Access (TDMA) to make sure the wireless communication is handled properly, to avoid "tag interference" and "reader interference".

None of the prior art includes a system of two or more locator chips that are in communication with each other. None of the prior art includes a "mated pair" of chips in communication with each other. A "mated pair" would not be possible with RFID chips, because RFID chips would not be able to communicate each other, execute functions using embedded programs, and each monitor whether the other chip in the pair was moved significantly further away. This feature is one of the main benefits of the present invention.

The present system is more modern than RFID chips as the use of cloud technologies and nanotechnologies are incorporated into many embodiments of the present system. Using a "mated pair" of chips also serves functions that are not present in any prior art.

Some Differences Between M2M Chips and RFID Chips

"M2M" here means "machine to machine". Machine to machine (M2M) is a broad label that can be used to describe any technology that enables networked devices to exchange information and perform actions without the manual assistance of humans. Key components of many M2M systems include sensors, a Wi-Fi or cellular communications link and autonomic computing software programmed to help a networked device interpret data and make decisions.

M2M chips can be networked in a manner very similar to LAN or WAN networks, but are exclusively used to allow machines, sensors, and controls, to communicate. These devices feed information they collect back to other devices in the network. This process allows a human (or an intelligent control unit) to assess what is going on across the whole network and issue appropriate instructions to member devices.

The technology which connects to distant machines using the help of the internet, and most of these connections are controlled using a piece of software stored on the chip. This technology is periodically automated.

One key difference between M2M and RFID chips is that M2M chips (Including silicon wafer chips) are capable of being programmed with an operating system, to coordinate with other M2M chips in the network, and with the central actuator. Silicon wafer chips can also be made in many different shapes, and can be thinner than RFID chips.

An actuator transforms electrical signals into different forms of energy such as motion or pressure.

M2M chips can therefore communicate directly with each other. They each can be programmed with an operating system, so the operating system of each M2M chip embedded in a different component of a large device can be programmed to cause that chip to react to information received from the other chips embedded in different parts of the device.

M2M chips are important as part of the "internet of things", IoT, which is the inter-networking of "smart devices", including, but not limited to, buildings, appliances, and automobiles, using embedded chips of different kinds. Based on the application domain, IoT products can be classified broadly into five different categories: smart wearable, smart home, smart city, smart environment, and smart enterprise.

Traditional M2M solutions typically rely on point-to-point communications using embedded hardware modules and either cellular or wired networks. In contrast, IoT solutions rely on IP-based networks to interface device data to a cloud or middleware platform.

Typical M2M solutions includes intelligent sensors and microprocessors embedded in the asset/device, and a wireless communications module that transmits and receives data to and from information management systems. The collected data is then processed and analyzed. The collected information is useful for improving business processes (e.g., reporting a machine status or breakdown, readings of liquid level in containers, or temperature readings of sensitive materials during shipment) resulting in competitive advantage.

Several wireless technologies (LTE, WiFi, BLE, ZigBee, RFID) can be used to capture and transport the data depending on the specific application.

The communications link may be Wi-Fi, but other wireless options such as cellular can also be used.

The M2M networking architecture for IoT connectivity uses aggregator devices to serve multiple end nodes.

Current M2M communications traffic consists largely of SMS (Short Message Service) or other message traffic traveling over conventional mobile networks, supplemented by wireless internet and, in some select cases, satellite circuits. Many mobile network operators deploy mobile packet gateways specifically for their M2M operations, separate from their general mobile data infrastructure. This simplifies business operations and allows optimization of network utilization.

The M2M networking architecture presently uses "aggregator" devices to serve multiple end nodes. An end node can include one M2M chips, or a group of M2M chips working together. The end M2M nodes may contain one or more sensors that report physical conditions to a remote site or are used with local embedded intelligence. One type of aggregator is a device that can receive wirelessly transmitted information from multiple end-nodes and transmit this information across the internet.

The aggregator connects to a "gateway" arranged for the application. The gateway may handle multiple aggregation points. The gateway will access a cellular network, and will transmit the information from the end node over the cellular network to the remote server, where human users can access the information more easily. The links between the end node, and aggregator, aggregator and gateway, and gateway and remote server may all be via Wi-Fi, another wireless connection, or another type of connection.

A gateway is a device that connects directly to the internet, and also receives input from the aggregators that receive input from the M2M nodes themselves.

A gateway API (Application Protocol Interface) may be used, to ensure that the data that the end nodes are sending is recognized by the gateway and sent to the remote server. In some applications, though, the aggregation points may not be necessary.

Certain data can trigger automated actions that are pre-programmed to take place. The machines communicate with each other (and with users) remotely.

Most nodes will probably report to a nearby aggregation point that serves multiple sensors. The communications link may be Wi-Fi, but other wireless options such as cellular are possible. This aggregation point then connects to a gateway setup for the application. The gateway may handle multiple aggregation points. In some applications, though, the aggregation points may not be necessary. Again, the link can be Wi-Fi or another wireless connection.

The application may also have multiple personal area networks (PANs) from ZigBee, Wi-Fi, or Bluetooth wireless sensor network connections. These might report to a separate gateway. The gateway then reports up to the next level via a cellular connection to the Internet cloud. An internet link connects to a server that hosts the middleware implementing the application. Other links are possible, too, depending on the scope of the application.

Researchers have made a scientific breakthrough in delivering the first wafer-scale graphene integrated circuits that are smaller than a pinhead. The circuits could heighten the sensitivity of current wireless devices. M2M chips may be made of graphene. This will allow them to be made in a wider variety of different forms, which makes them easier to hide in different parts of an automobile.

Some M2M chips of the present invention will consist of a graphene transistor and a pair of inductors compactly integrated on a silicon carbide (SiC) wafer.

Nature of M2M Technology

Many M2M systems involve large numbers of devices delivering information and collectively making decisions without human interaction. Adding human control to machine interaction markedly broadens the scope of M2M possibilities. One benefit is real-time monitoring and control, which implies each M2M node embeds an embedded application (5) that interacts with the intelligence at remote collection points and related servers. Each of hundreds of M2M node can send information indirectly to a single remote server (7). The remote server will then make calculations based on the information that it has received from the M2M nodes, will make a decision, and will send a command, based on these calculations, to each of the M2M nodes. The M2M nodes can then individually command machinery based on the information received from the remote server (7), and send status updates to the remote server (7).

A nanochip is an integrated circuit that is so small, in physical terms, that individual particles of matter play major roles. The smaller an electronic system can be made, the more processing power can fit into a given physical volume, the less energy is required to run it, and the faster it can work (because distances among components are reduced, minimizing charge-carrier transit time).

M2M chips, can be designed as nanochips, so that they take up little physical space, and use very little electrical energy. This makes the M2M chips of the present invention easier to hide, and also means that the M2M chips of the present invention will use very little electrical power. This is vitally important, because many of the M2M chips of the present invention are designed to function as "embedded" chips that are implanted in one place, and must stay in that place and broadcast for years. The M2M chips that are part of long-range transmitters, in particular, must do this.

An M2M chip can take up less space than a pinhead.

Carbon nanotube chips, and silicon carbide chips, can be nanochips.

Advantages of M2M Chips Vs. Previous Technologies

M2M chips are very versatile in terms of size and shape. This is a substantial advantage over passive and active RFID chips, because RFID chips have a specific size and shape, about the size of a grain of rice. This is because of the requirements of RFID technology. M2M chips, by contrast, can be shaped as blocks, can be square, circular, rectangular, flat, and can have other shapes. This is important because the versatility of M2M chips means that they are easier to embed in devices, and in locations such as license plates, than RFID chips. M2M chips can be embedded in a greater variety of locations within a device than RFID chips, and can also be embedded in more types of devices for the same reason. An M2M chip can also be embedded in locations that are more secure, within a device, than RFID chips. For example, an M2M chip can be embedded in a location within a device where it is protected by metal plates, which will stop the M2M chip from being damaged. An RFID may not be able to fit within this location because of its size.

Many M2M chips also weigh less than RFID chips. This gives an M2M chip an advantage over RFID chips when weight is at a premium, such as when being used with drones. The smaller weight of an M2M chip means that the different components of a device (such as the different components of a drone) can each be embedded with their own M2M chip.

The fact that M2M chips can have many different sizes and shapes, combined with the fact that M2M chips can be embedded in many more places than RFID chips, means that M2M chips are much harder for thieves to remove than RFID chips. A thief trying to remove the tracking chip from a device will probably have more trouble identifying and finding an M2M chip that is shaped in an unexpected manner, than the thief would have in removing an RFID chip.

It is important to note that the M2M chips, in this instance, will have to be programmed with an embedded application (5) to realize their capabilities. The pathway which information takes, from the end node, which contains the M2M chips, to the central server, is also different from the pathway that this information would take in an RFID setting. The M2M chip can transmit information to local aggregators, and receive information from these aggregators. The aggregators then connect to gateways that connect to remote servers. The remote servers can then send instructions back to the gateways, and aggregators, to the M2M chips themselves. A remote server can also tell how far apart two M2M chips are located, by comparing the signal received from each of them. Alternatively, the M2M chips themselves can receive information from each other, including information about the M2M chips' location in relation to each other, and the M2M chips can then send this information to the remote server in the manner described above.

M2M chips embedded in different parts of the same device, such as M2M chips embedded in different parts of an automobile, can communicate directly with each other, and each M2M chip can perform actions based on the information it is receiving from other M2M chips embedded in different parts of the same automobile. For example, if the M2M chips are in communication with each other, each M2M chip can command components of the automobile to move, or alternatively, can cause an alarm to sound, based on information that M2M chips is receiving from the other M2M chips in the automobile.

M2M data can travel via wired or wireless transport and involve minimal/trivial payloads (e.g., current temperature, location data or simply node ID) over long intervals, or massive data sets and latency-sensitive high-frequency data streams.

Signaling System No. 7 (SS7) is a set of telephone signaling protocols developed in 1975, which is used to set up and tear down most of the world's publicly switched telephone network (PSTN) telephone calls. It also performs number translation, local number portability, prepaid billing, Short Message Service (SMS), and other mass market services.

Much of the infrastructure needed to carry information from embedded M2M chips to central servers has already been built. The SysLINK M2M Gateway is a full-function router, including DHCP, NAT, VPN, and firewall capabilities. With enterprise quality remote management, network configuration options can be changed or updated via remote control.

M2M ecosystem suppliers have developed special versions of wireless chipsets and SIMs to serve this market, with price points and specifications targeted at M2M terminal nodes. Second, most M2M devices don't need voice or even full (3G) IP communications capabilities—they use SS7 networks and actually use SMS to communicate upstream despite lack of guaranteed delivery, security, etc.

The IPv6 Protocol and its Implications

The IPv6 ("Internet Protocol Version 6") is the latest standard for creating internet addresses. This is being gradually rolled out throughout the world, and will be one of the main standards governing the internet. IPv6 allows each device on the internet to have its own IP address. This includes "smart devices" and automobiles that are connected to the internet. IPv6 uses 128-bit internet addresses, which theoretically would allow $2^{128}$ devices, or $3.4 \times 10^{38}$ devices, to have their own internet addresses. Therefore, the mated pair of chips in every drone, automobile, or long-range transmitter could have its own, unique, IP address. If there are more than two chips in a drone, automobile, or long-range transmitter, the group of chips in the drone, automobile, or long-range transmitter can have its own, unique, IP address. This is important, because, for example, if a mated pair of chips in a drone is broadcasting, it will be broadcasting from the drone's IP address, which will mean that the specific drone can be identified by the broadcast.

The System

Most variations of the invention will involve having a "mated pair" of two M2M chips, which have the same IP address, which they were assigned in the factory that made the chips. The factory, if desired will be able to choose from among a specific group of IP addresses, that have characteristics in common, so that a law enforcement authority will be able to detect the origin of the "mated pair" of M2M chips. These two M2M chips will then be placed together in the same area of a device, or alternatively, placed in different areas of the device. The M2M chips will be designed to be difficult to find, and to use low amounts of electrical power. They will also have the ability to continually broadcast, so that an entity seeking to find the position of a specific M2M chip will be able to simply listen to the broadcasts and, in most cases, determine the location of the M2M chip, and any object that is attached to the M2M chip. The law enforcement authority may do this by accessing the information transmitted by the gateways that are receiving information from the aggregators that are receiving information from the M2M chip. This information will include information about the distance between the M2M chip and each aggregator receiving information from it. The law enforcement agency may also determine the location of the M2M chip using triangulation by other methods.

In all embodiments of the invention, the M2M chips will be transmitting continuously, and therefore if a chip ever ceases to transmit, this will be evident to the remote server, aggregator, or other monitoring station. Therefore, the program at the remote server can be designed to send an alarm notification when one of the chips stops transmitting.

SUMMARY OF THE INVENTION

Term Numbers

Actuator (1). RFID Chip (2). M2M Chip (3). Polymer strip (4). Embedded application (5). Data collector (6). Remote server (7). Aggregator (8). Gateway (9). Epoxy base (10). Mated pair (11).

Each M2M chip can be programmed to detect directions and distances that other chips are supposed to be broadcasting from, and therefore, each M2M chip can detect whether other M2M chips that are supposed to be nearby have moved. A "chipset" is a group of two or more mated M2M chips that have the same IP address, or closely related IP addresses where each M2M chip is programmed with a record of the IP addresses of the other chips in the set.

Silicon wafer chips, graphene chips, and carbon nanotube chips are three types of examples of chips that can be used as M2M chips. Other types of chips may potentially be used as M2M chips.

It is strongly recommended that, if two or more mated M2M chips do not have exactly the same IP address, their IP addresses should be similar enough that groups such as law enforcement can tell that the two chips come from different components of the same device. This might be accomplished by having some parts of the IP address the same for the chips embedded in all components of all devices of that class, and having other parts of the IP address for each chip vary, depending on which device that chip was embedded in, and having still other parts of the IP address for each chip vary, depending on what component of the device that chip is embedded in. Law enforcement can then recognize the type of device, component of the device, and identity of the individual device where an M2M chip is embedded, by scanning and examining the M2M chips IP address. An example is that law enforcement can scan the address of an M2M chip that is inside a stolen automobile radio, and determine the maker and year of the radio by examining the parts of the M2M chip's IP address that are unique to automobile radios of the type in which the chip was embedded. Law enforcement can also determine that the chip came from a radio by examining the parts of the chip's IP address pertaining to the type of device, and determine the specific radio that the chip was embedded in, by scanning the parts of the chip's IP address that are unique for each chip.

The First Embodiment

The M2M chips of the first embodiment will contain an embedded application (5), which will be programmed to transmit the M2M chips' location to an aggregator, which will transmit it to a remote server.

In some variations of the embedded application, the embedded application will have a transmitting module, which will transmit the M2M chip's status continuously, and the embedded application will have a receiving module, which will receive signals from any other chips which are also broadcasting, and which are mated with the M2M chip. The receiving module will also receive any other signals that are broadcast to the M2M chip by aggregators or other broadcasting machines. The embedded application may also have an execution module, which will recognize any signals that command the M2M chip to perform specific actions, or any signals that require the M2M chip to transmit commands to perform actions to other components. The embedded application may also have a command module that can be interlinked with the execution module, or with all of the other modules. The command module will transmit commands to other components connected to the M2M chip. The embedded application can have other modules.

The transmitting module can use Zigbee, low-energy Bluetooth (Low-energy BLE) or one of the other methods of wireless communication listed herein, to communicate with multiple aggregators. The transmitting module, in some embodiments, can receive information from the other modules in the embedded application and transmit this information.

All or some of the modules can be interlinked, to enable communication between them.

The embedded application may, but does not have to, include an embedded application framework on top of Linux and application programming interfaces (APIs).

The embedded application may, but does not have to, include APIs to communicate with multiple aggregator at the same time.

The embedded application may also use the Mihini framework to transmit and receive information.

An M2M chip can be hidden in any location within a device or an automobile, because M2M chips differ in size and shape. Therefore, an M2M chip can be given the right size and shape to fit into any space within the device or automobile. This is extremely important because an M2M chip can be embedded in a location where it is hard to find and remove. The M2M chip can be placed inside the frame of the automobile, for example. A thief who steals the automobile, and searches for the M2M chip, will not know where to look, and so will have to exert great effort to remove the M2M chip. It is also possible to have multiple M2M chips, programmed with the same or similar embedded applications (5) in different parts of the automobile. A thief who steals the automobile will therefore have to remove all of them, in order to ensure that the M2M chips (3) cannot transmit the location of the automobile.

The first embodiment of the present invention utilizes M2M chips (3), hidden within automobile parts such as the automobile frame, and programmed with an embedded application (5) that allows for wireless communication between the M2M chips (3) and a remote server (7), possibly via one or more data collectors (6). The M2M chips can be of any size and shape.

The embedded application (5) will include a unique identifier for the automobile. Conceptually, this can be seen as similar to the "VIN number" for the automobile. The unique identifier can be the same as the IP address for the set of M2M chips.

The M2M chips will be part of an end node.

The embedded applications in the M2M chips will communicate with aggregators, which will then send this information via a gateway to the remote server. The remote server will be able to "triangulate" the location of the M2M chips, and therefore the automobile which includes the M2M chips. The remote server will do this by comparing the information that the aggregators are sending to it, about the broadcasts that the aggregators are receiving from the M2M chips.

In another variation of the invention, one member of the "mated pair" of M2M chips will be located in the frame of the automobile, and the other chip in the pair will be located on or near the license plate of the automobile.

In other variations of the invention, one or both members of a "mated pair" of M2M chips will be placed on another part of an automobile.

This system has several benefits to automobile owners. The system is very reliable, and relatively cheap. A consumer can theoretically activate the system on his vehicle, as part of the Department of Motor Vehicles registration for that vehicle. Because M2M chips are cheap to manufacture, the system describe herein is much cheaper to use, for each vehicle, than Onstar or LoJack.

Some other potential benefits of this system to consumers are around-the-clock monitoring—cost-efficiency, lack of no server or hosting costs, unlimited scalability, data security and reliability, any time, any place administration, cloud integration, and private-label solutions.

Insurance companies would also benefit from this system because stolen vehicles could be recovered much more quickly, using this system, than otherwise.

One of the ways that aggregators will be able to locate an automobile, or parts of an automobile, through detecting the signals broadcast by the M2M chips in the automobile is through triangulation.

One method of triangulation is for a single aggregator to receive signals from the M2M chips located on several different areas of an automobile. The aggregator will be able to tell the distance from itself to each of the M2M chips, and will be able to detect that the M2M chips are part of the same automobile, because of the similarity of the M2M chips' IP addresses. The aggregator will then detect the location of the automobile by taking the distance between the aggregator and each of the chips within the automobile, and determining the location of the automobile at which the distances that the aggregator is recording, between itself and each of the M2M chips in the automobile, can all be true.

Alternatively, each of several aggregators, can determine the distance between itself and the M2M chips in the automobile. These aggregators will all be all in communication with the same remote server (7), and the remote server can triangulate the location of the automobile by finding the location of the automobile where the distance between each of the aggregators and the automobile, that each of the aggregators is recording, is correct.

Other methods of triangulation are possible.

The Bonding

This section discusses some of the ways that one or both members of a mated pair of chips can be bonded to different parts of an automobile, or alternatively, to a drone, or to a piece of clothing.

Thermal fusion bonding involves simultaneous application of pressure and heat. Substrates are heated to temperatures near or above the glass transition temperature (Tg) of one or both of the substrate materials. This technique is straightforward, can be applied to many thermoplastic materials and gives relatively high bonding strengths; however, un-optimized temperatures and pressures or use of materials with different Tg may result in channel deformation and collapse. Solvent-based bonding techniques are promising to relax the constraints on the temperature and the bonding time. A compatible solvent can be applied to substrates in liquid or vapor phase prior to mating them under pressure. Mair et al. reported chips resistant to pressures as high as 34.6 MPa using solvent-based bonding of Cyclic Olefin Copolymer (COC) substrates at room-temperature. Another commonly used low-temperature bonding technique is localized welding. Bonding can be done by locally applying laser or microwave, but these techniques typically require an absorbent layer at the interface. Instead, ultrasonic welding, which involves the application of an ultrasonic energy to locally weld the interfaces of thermoplastic components. PDMS is an excellent material for rapid prototyping and easy sealing of many LOC devices. However, it is known to have some drawbacks, such as adsorption of hydrophobic molecules, short-term stability after surface treatment, swelling in organic solvents, water permeability, and incompatibility with very high pressure operations.

Thermoplastics show a wide variety of material properties that are attractive for LOC applications. Many of their properties, including elasticity, mechanical strength, optical transparency, auto-fluorescence, chemical stability, and biocompatibility, can be tailored according to the constraints imposed by the manufacturing process and the application. Patterning of micrometer- and sub-micrometer-sized structures can be done using various methods, among which hot embossing and injection molding are the most widely utilized for high volume production.

Thermal fusion bonding can therefore bond the chips in a mated pair of M2M chips, or a larger mated group of M2M chips, to a license plate, the frame of an automobile, or another location within the automobile.

The chips in the pair may also be placed inside foam that is attached to the automobile frame or other parts of the automobile.

Some More Specific Versions of the Invention

This can be known as the "mate to match" system. It can be used with a group of chips that constantly communicate and monitor each others' positions via triangulation. The chips can be placed in different areas of an automobile or another vehicle, and can monitor the position of the different parts of the automobile relative to each other. The chips will each be programmed to broadcast its identifying information, and each chip will be programmed with the identifying information of the other chips in the set. The chips can also be hidden to make removal harder.

A specific chip type can look like small, micro thin wafer squares, or micro rounded shapes (discs), micro rectangular styles, varying from as less than the size of a penny or dime, to a nano-sized chip less than a few centimeters in size. These chips are silicon based, using micro logic gates for operation. Silicon wafer chips are one type of chip that can serve this purpose.

Embedding of the chip can be directly bonded to the rear outside surface of a license plate, and covered in a polymer shielding. A chip can also be embedded on the body or frame of any type of vehicle.

Mate 2 Match, or Match 2 Mate, or Micromode 2 Match, or Match 2 Micromode—

Definition

The matching and mating of the chipsets into an exacting assembly or platform, that then connects and sends telemetry in and out constantly. This "sandwich" type of chipsets can also be aligned with, or connected to another onboard matched/mated Sensor Receiver that then sends out telemetry in constant modes.

The Match 2 Mate or Mate 2 Match can then be tracked synonymously along any routes, at all times, using the m2m/IOT CLOUD integrated tracking. This invention device will be incorporated into billions of items in the near future, resulting in total worldwide coverage for any assets needing protection.

Since this invention is to "protect, detect, send telemetry out" using sophisticated chipsets, this idea will prevent, or deter, or at least "Identify" where a missing, lost, or stolen plate(s) are at, as well as their mated/matched assets of any kind.

ASPECTS OF THE INVENTION

The purpose, scope, and application of one group of embodiments of this invention was to put into direct focus the apparent lack thereof, or not in use, a method of "specifically" tracking license plates with their body-to-plate attachments. The chipsets can also transmit data to mobile, fixed, satellite, or other point-to-point relay "stations" and computer systems, using the CLOUD systems. The idea came to mind as there is presently no way a individual plate can be tracked, if lost, stolen, fraudulently changed, or otherwise tampered with. The M2M chips, when paired or mated to the plate-to-body, plate-to-frame, can also be embedded into a plate and portion of a vehicle or frame body, that of which is not being done yet.

The plate tracking by chip is not being done anywhere in America, or the world at present. The uniqueness of these embodiments of the invention is to have an "implant" of a chipset to mate to the objects to be tracked. As new hybrids of computers, systems, and other new platforms comes online in the future, the invention will enhance the security, protection, tracking, and location(s) of all "Plated" objects, vehicle and body frames and so forth.

The chipset system the inventor thought of is a new, unique way, of enhancing by "mating" a system of the chipset(s) onto an area of the license plate, to the body or frame of a vehicle or object, such as trailer, boat, motorcycle, busses, and so on. Since plates of all kinds are used throughout the USA and the world, the invention, as applied can now be used to track "both" plates and their attachment objects as described above.

1. Since license plates are easily exchangeable by the nature of their construction, it would benefit and enhance its security by the use of the M2M chipsets, and create a "redundancy of reliance" on tracking and location.
2. The plate tracking can then be tied into systems that may be in use for tracking for such items, currently of which only "Visual, recorded, and physical locations" of plated objects are done only at the time "seen". The chipsets applied will correct this shortfall by "instantly using telemetry", connect to the new M2M/IOT systems, and will track the plates and their mated objects in a "real" time format.
3. Features of the invention would also use a nano sized chipset with newer applications onto the plate and vehicle(s) and frames. Since M2M chips can also be used in nano chip form, their very presence is literally quite "invisible" to people looking at the plates. In real time, no criminal that is in the process of stealing something of "Grand Theft Auto" value can afford to act slowly. (Criminals have no time to waste stealing something—"gone in 60 seconds" is the norm). This invention, since its operation uses "constant telemetry", tracking of the plate, is immediate, with location of the chips mated to the plate and vehicle hard to get rid of. The chips are set to send off a signal if a break in signal happens, then the tracking, by use of its IOT interface occurs.
4. Another variation of the invention as a "Whole new set of plates and M2M chipsets" embedded together, as a sort of new plate package and design using ultra modern metal and silicon materials, or space age new type of plastic and metal meshing. In other words, a whole "New" plate design with a chipset embedded. That way, the plates and chipsets are a new creation and replacement for the old standard plates on many vehicles and body frames now in use—basically just slightly smaller, lighter, more durable, and virtually indestructible. Plus with the chipsets mated as such to the plates, protection is apparent.
5. The inventor foresees a new kind of way to "plate and track" vehicles, their bodies, components, and many other wheeled and towed assets, and also foresee a new age in which a new concept of plate will emerge with the chipset invention.

6. The inventor can even foresee a way of an owner to virtually and instantly find or know, by using the chipset invention, of "where and how" to track their property and assets using interfaced, handheld or station based, home type of systems in the future. The new chipsets and plate invention is a way of tracking and protection.

The data collectors used in some embodiments of the invention fulfill the combined function of both gateways and aggregators, but belong to a virtual private network. The M2M chips broadcast directly to the data collector, which, in turn, connects to the cellular network and sends the information to the remote server.

A Summary of Another Variation of the Invention

The invention includes a group of carbon wafer chips, with the same IP address, where one chip is embedded in the license plate of an automobile, and other chips are embedded in different parts of the frame of the automobile. The chips are all constantly broadcasting telemetry, and are in communication with each other. They are also all programmed with an operating system. If the license plate, or a part of the automobile is stolen, the other chips will detect this, because the chip in the stolen license plate will either stop broadcasting or suddenly be broadcasting from further away. The operating systems on the other chips will be programmed to "notice" this, and cause an alarm to sound.

The U.S. Border Patrol has a strong interest in checking to make sure that the license plates on automobiles that cross the border are genuine, for the purpose of detecting and deterring smuggling. The present invention makes this easier because the M2M chip of the present invention on a license plate that has been stolen and placed on another vehicle will broadcast a very different IP address from the chips of the present invention that are embedded within that vehicle. The border patrol, or other law enforcement, can detect this, and conclude quickly that the license plate was probably stolen.

Another Variation of the Invention Useful in Agriculture

Similar systems can also be used to determine whether parts of a plant are being disturbed by placing the carbon wafer chips on different parts of the plant. Certain plants (particularly those grown in some hydroponic greenhouses) are high-value, and are cultivated by workers who may try to steal parts of the plant. The owner of the plants can therefore place carbon wafer chips of the present invention on different parts of a plant. These chips will broadcast the same IP address, and will constantly communicate with each other. If a person tries to remove parts of the plant that have chips of the present invention embedded on them, the other chips in the plant will "notice" that the chips on the parts of the plant being removed have stopped broadcasting, or are broadcasting from further away. They will then transmit an alarm signal to a central location, which will sound an alarm.

Some Types of the Programs

Each chip transmits data and telemetry constantly. The chips are "Pre-set", and paired/matched at the factory in order to make them communicate effectively when mounted to surfaces. The chips can be pre-set to have the same IP address, and this address can be disclosed to the person buying the article attached to the M2M chip module.

The embedded application's transmitting module will be programmed to transmit from the IP address of each M2M chip.

More Information about Some Kinds of Chips

A logic gate is an idealized or physical device implementing a Boolean Function; that is, it performs a logical operation on one or more binary inputs and produces a single binary output. The fact that the M2M chips of the present invention use very small logic gates means that these small M2M chips can perform a larger number of binary operations.

A Specific Embodiment of the Programs for Running the Chips

Network Operating System: a user can connect to, manage and process data from any remote system which is able to communicate by any of standardized open protocols in an economic way. In few easy steps and with possibility to avoid mayor upfront investment, a company can build an individual IOT or machine-to-machine (M2M) application.

(Logical Steps) Developers can take advantage of an end-to-end open-source software stack for M2M embedded development, extending from the embedded device to the connection with the server infrastructure, with all of the tools necessary to develop M2M solutions.

Today's machine-to-machine (M2M) communications market is held back by fragmentation in the industry, with too many basic functions remaining closed and proprietary. In an environment where M2M vendors develop their own proprietary implementations of the basic M2M communications stack, huge amounts of time and resources are wasted.

Now developers can take advantage of an end-to-end open-source software stack for M2M embedded development, extending from the embedded device to the connection with the server infrastructure, with all of the tools necessary to develop M2M solutions.

This open-source software stack encompasses a large and growing set of open-source M2M tools and libraries, an embedded application framework on top of Linux and application programming interfaces (APIs) to provide a common platform for M2M applications, and a growing body of standardized and open-source communication protocols for embedded applications.

Together, these open-source blocks allow developers to create their own M2M applications and run them on various types of hardware for the first time. As more developers and vendors adopt and expand this open-source M2M platform, the pace of M2M innovation will accelerate considerably.

Advantages of an Open-Source M2M Software Stack

With the introduction of the Mihini framework, the M2M IWG now has real source code and a concrete implementation of all elements of the software stack. As a result, developers now can take advantage of a complete, end-to-end open-source platform for M2M applications, from the embedded device to the connection with the server. This open-source platform presents many benefits:

A. Interoperability: Any new M2M solution should be able to work with thousands of devices already deployed in the field. Open communication protocols and royalty-free implementations of the M2M communications stack can address this problem and potentially support new communication scenarios between devices that are not feasible today.

B. Expanding applicability: As more developers take advantage of and expand this open-source platform, entire ecosystems of libraries will emerge that developers can draw on for ready-to-use implementations of various technology stacks. As the number of open-source libraries expands, the pace of M2M development and innovation will accelerate.

C. Increased hardware flexibility: As more vendors adopt an open, standardized approach to M2M development, developers will have far more flexibility and choice in designing embedded systems. They will be able to pick and choose the optimal hardware for a given application in a way that is not possible today.

D. Accelerated innovation: The more vendors and developers standardize on a basic software stack, the less time and resources they will need to devote to designing, testing, and updating discrete proprietary systems, and the more they will be able to reuse and build on their work. More than any other factor, this reusability will allow for the kind of experimentation and innovation necessary to meet the demands of the M2M market in the coming years.

Storage—An Example

Some examples of programs that can become part of the base program are listed below. Powered by Intel® Xeon® processors, Isilon solutions are ideal for demanding enterprise file workloads.

A. Simplify management no matter how large your data becomes.
B. Cut costs with over 80% utilization and automated tiering.
C. Increase operational flexibility with multiprotocol support.
D. Scale performance and capacity easily and predictably, Increase performance, efficiency, and flexibility with the new generation of Isilon storage. Choose from all-flash, hybrid, and archive systems.

Dell EMC VMAX all Flash Family Data Sheet

VMAX All Flash has_high performance and massive capacity. With rich data services, incredible reliability, and universal support, VMAX All Flash: Hyper Scale and Consolidation, Diverse Workload Consolidation, Rich Enterprise Data Services, Engineered for Flash, Simplified Planning and Deployment, Deep Ecosystem Integration.

While some M2M solutions can be relatively simple, with a single application operating upon data from a single type of device over one type of communications system, many solutions are becoming more complex as devices proliferate through the world in the age of the Internet of Things (IoT). Advanced M2M solutions may have multiple services on the edge node, several different connectivity requirements, various data consumers, and geographically diverse services and devices. These distributed systems require an intermediary system, also called an M2M integration platform, to connect them seamlessly to business applications.

As a result, M2M applications are much more complex, with multiple services on the edge node, various connectivity options and customer specific business logic not only in the data center but also embedded into edge devices. Plus, the services may be geographically dispersed and have several device data consumers The use of CLOUD based Storage Systems are the way to store future relevant data for M2M/IOT applications and information.

Example—Embedding, Wireless Applications which can be Used Along with Data Accumulators Use of the Chipsets to Continually Detect and Locate Drones Chipsets can be embedded into all makes, models, and types of Drones and Drone Remote Control boxes (RCBs) in use by civilians and official agencies. This will include future models of drones. This allows the tracking, searching, monitoring, and location of the drones, whether flying or not.

Each drone can include a "mated chipset" for the drone itself, and a "mated chipset" that is part of the user's RCB. Since Drone operators can only fly their drones for a limited distance, the installment of the chipsets into the Drones and their RCBs will specifically add security, and ease, related to detecting these drones in flight, and finding drones after they land. The RCBs will also be easier to find.

Use of the Chipsets for Tracking Objects in Space and Near-Earth Objects

Near-Earth objects such as asteroids and large meteors pose a threat to life on Earth, because if such an object were to hit Earth, it would create an explosion. The size of the explosion is proportional to the mass and velocity of the asteroid or meteor. The impact of an object larger than 100 feet in diameter can create an explosion large enough to destroy a city. The impact of an object larger than ¾ of a mile in diameter can create an impact crater that is 20 miles or larger, in diameter, and an explosion large enough to seriously affect the Earth's climate for one or more years. A potentially hazardous object (PHO) is a near-Earth asteroid or comet with the potential to make close approaches to Earth, and enough size to cause significant damage if the object were to hit Earth.

NASA has therefore attempted to detect and track PHOs, and has detected 1,786 PHOs to date. NASA also established the "Planetary Defense Coordination Office" in January 2016, to catalogue and track potentially hazardous PHOs that are larger than 30 to 50 meters in diameter. NASA then intends to coordinate an effective threat response and mitigation effort. It is estimated that there are a large number of undetected PHOs.

The main ways of detecting such objects are through visual and infrared detection. This is more effective with larger PHOs, however smaller PHOs, larger than 30 meters wide, can still create significant damage if they hit Earth.

In the past, astronomers have sometimes discovered an asteroid, and then been unable to track the asteroid for months, years, or decades afterwards, because they were unable to detect the asteroid by visual or other means. The possibility of a PHO being "lost" in this manner, after the PHO is first detected, is therefore larger, for smaller PHOs, which are harder to see, and therefore harder to detect visually.

A method of making PHOs easily observable, after they have been detected, is therefore necessary. Ideally, the PHOs should be easily observable from a terrestrial monitoring station on Earth, but if the PHOs are visible from a remote station, in space, that transmits information to Earth, this will also be effective. The monitoring station may be manned or robotic. The method of making PHOs easily observable should also be as cheap as possible. The method should also be durable, so that once the method is applied to a PHO, the PHO will be continuously detected, and if the PHO suddenly stops being detected, the monitoring station will be aware that something has gone wrong.

The present invention solves this problem. The mated pairs of chips, comprising one of the "chipsets", can be encased in a hardened shell, to protect the chips from radiation. This is needed in space because of the cosmic radiation there. This hardened shell can then be equipped with a grappling mechanism, which will grab onto objects attached to it. The hardened shell, including the mated pair of chipsets, will be called the "long-range transmitter". This will still be physically small, and so a small, automated spacecraft will be able to carry a large number of long-range transmitters.

The small, automated spacecraft (The "locator spacecraft") will fly to the PHO, and use a robotic arm to place an adhesive upon part of the PHO. The locator spacecraft will then place a long-range transmitter upon the PHO, upon the area with the adhesive. The locator spacecraft will then activate the grappling mechanism, and the long-range transmitter will grapple onto the PHO, and remain there. The adhesive will also ensure that the long-range transmitter remains attached to the PHO. The long-range transmitter will then broadcast its location, using radio waves. The location of the long-range transmitter will also be the location of the PHO attached to it. The long-range transmitter will broadcast regularly, and these broadcasts can be received by receiving stations. Remote receiving stations, which are off of Earth, may receive the broadcast from the long-range transmitter, or a terrestrial receiving station on Earth may receive the broadcast, or both. If a remote receiving station receives the broadcast, the remote receiving station can amalgamate and transmit to Earth the information contained in the broadcasts of some or all of the long-range transmitters broadcasting from different PHOs. If multiple remote receiving stations, off of Earth, receive the broadcast, each remote receiving station will be able to transmit the direction of the PHO from that remote receiving station to a central location, such as a terrestrial receiving station on Earth, and so the central location will be able to triangulate the location of the PHO from the inputs received from the different remote receiving stations.

Use of remote receiving stations has the additional advantage that remote receiving stations will be free of the atmospheric interference caused by Earth's atmosphere, so they will be able to detect fainter signals that might be blocked by Earth's atmosphere. This allows remote receiving stations to detect signals from long-range transmitters attached to PHOs that are further away.

The locator spacecraft will be able to transport a large number of long-range transmitters, so after the locator spacecraft places a long-range transmitter upon one PHO, the locator spacecraft will fly to another PHO and place a long-range transmitter on that PHO, and so on.

The locator spacecraft will have the ability to receive and execute commands, including commands about where to fly, from human controllers on the ground.

Therefore, the remote receiving station, or a terrestrial receiving station on Earth, will constantly be aware of the location of the PHO afterwards, because the long-range transmitter will broadcast its location, thus also broadcasting the location of the PHO. This broadcast will be received by the remote receiving station, or a terrestrial receiving station on Earth, which will then be able to analyze characteristics of the broadcast to discern the location of the source of the broadcast, and therefore be able to tell the location of the PHO.

This system will also allow NASA to efficiently track PHOs that are less than 30 meters wide, if desired.

In all embodiments, each long-range transmitter will contain a battery or other power source, that will power the long-range transmitter, allowing it to broadcast. In some embodiments, each long-range transmitter will also contain a solar cell, connected to the power source, which will recharge the power source. The long-range transmitter will then be able to continue broadcasting for a longer period.

NASA and other space agencies have also had issues with man-made "space debris" orbiting Earth. This space debris includes items such as old satellites, and waste discarded from spacecraft. This space debris is not a threat to Earth itself, but is a threat to satellites and spacecraft near to Earth. As of December, 2016, there had been five collisions between satellites and man-made space debris. The U.S. Strategic Command tracks about 17,000 man-made objects in near-Earth orbit, but there are thousands of others that are too small to be tracked easily.

The present invention also provides a way to track man-made space debris. A locator spacecraft, carrying numerous long-range transmitters, can fly to one piece of man-made space debris, and place a long-range transmitter on that piece of space debris in a manner similar to the manner in which a long-range transmitter would be placed on an asteroid. The locator spacecraft can then fly to another piece of space debris, and place a long-range transmitter on that piece of space debris, in the same manner. All of the pieces of man-made space debris attached to long-range transmitters will be easy to track, from Earth, or from a remote receiving station, because the pieces of man-made space debris will be attached to long-range transmitters that emit broadcasts that can be detected from Earth, or from the remote receiving station.

The long-range transmitters installed on both PHOs and man-made space debris will contain batteries, or another power source, that will last for years. Therefore, the long-range transmitters installed on PHOs and man-made space debris will continue to broadcast for years. If a long-range transmitter has been broadcasting continuously, and then suddenly stops, before its power is supposed to run out, the absence of the broadcast can be noticed by human operators, or a computer, in a terrestrial monitoring station or remote receiving station. The human operators, or computer, will then be aware that something has gone wrong, and can send another locator spacecraft to the projected position of the PHO or piece of space debris.

This method will also allow astronomers to plot the orbital paths of PHOs and pieces of space debris more easily. Astronomers have previously detected objects through visual observation and then been unable to visually detect these objects again, because the objects are too small to be detected easily. It is usually necessary to detect an object at several points, in its orbital cycle, in order to plot the orbital cycle of that object. The present invention will allow astronomers to detect an object (such as a PHO or piece of space debris) continually, by detecting the broadcasts coming from the long-range transmitter attached to that object.

The M2M chips in the long-range transmitters can be configured so that the signals they broadcast are detectable by any entity with a receiver. Therefore, manned spacecraft, space stations, and satellites will be able to easily detect, and avoid, space debris and PHOs by detecting the broadcasts created by the M2M chips in the long-range transmitters attached to these PHOs, or pieces of space debris. The spacecraft or satellite can then correct its course to avoid the PHO or piece of space debris.

Some Other Variations of the Invention

In other embodiments of the invention, a mated group of the chips that are part of the present invention will be part of a piece of clothing, such as a jacket. The embedded chips will then broadcast information identifying themselves by their IP address, which will allow aggregators to determine the location of the wearer. These embedded chips will be difficult for a person intending harm to the wearer to find, and will also consume very small amounts of power. A pair of embedded chips may include enough power with the chips to last for four years, which is a longer period of time than many items of clothing are used. The chips can be placed in virtually any location in a piece of clothing. If the person wearing the clothing is then kidnapped, law enforcement can then monitor the signals being emitted from the IP address of the piece of clothing, so that they can locate the piece of clothing, and hopefully, its wearer.

The discussion included in this patent is intended to serve as a basic description. The reader should be aware that the specific discussion may not explicitly describe all embodiments possible, and alternatives are implicit, or obvious to those skilled in the art. Also, this discussion may not fully explain the generic nature of the invention and may not explicitly show how each feature or element can actually represent equivalent elements. Again, these are implicitly included in this disclosure. Where the invention is described in device-oriented terminology, each element of the device implicitly performs a function. It should also be understood that a variety of changes may be made to the embodiments that have been described, without departing from the essence of the invention. Such changes are implicitly included in the description. These changes still fall within the scope of this invention.

Furthermore, each of the various elements of the invention and claims may also be achieved in a variety of manners. This disclosure should be understood to encompass each such variation, whether it is a variation of an apparatus embodiment, a method embodiment, or a variation in any element of an embodiment. As the disclosure relates to elements of the invention, the words describing each element may be replaced by equivalent apparatus terms, even if only the function or result is the same. Such equivalent, broader, or even more generic terms should be considered to be encompassed in the description of each element or action. Such terms can be substituted, when desired, to make explicit the implicitly broad coverage to which this invention is entitled. It should be understood that all actions may be expressed as a means for taking the action in question, or may be expressed as an element for causing the action in question. Similarly, each physical element disclosed should be understood to encompass a disclosure of the action which that physical element facilitates. Such changes and terms are to be understood to be explicitly included in the description.

DETAILED DESCRIPTION OF THE DRAWINGS

Figure 1:
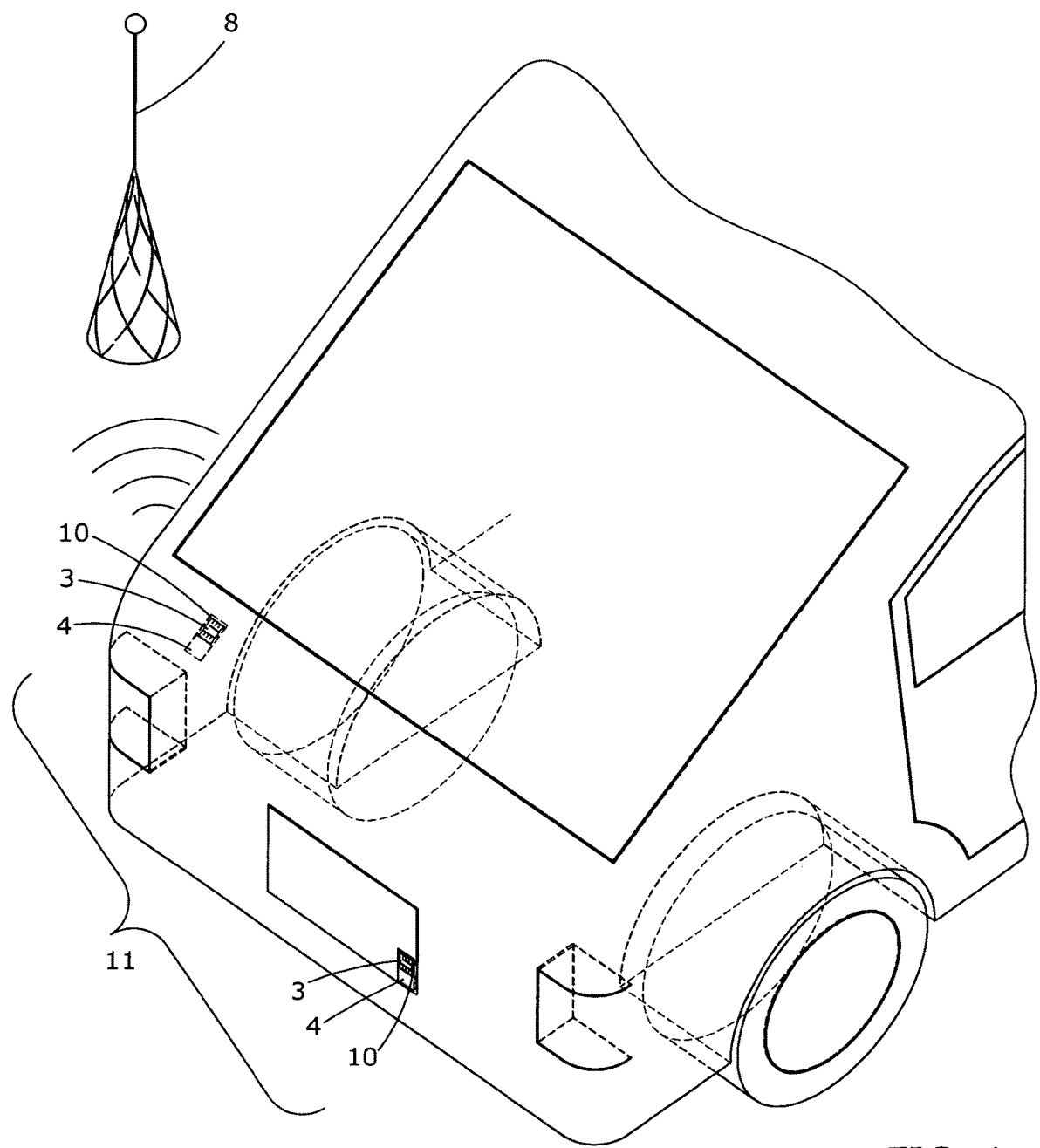
FIG. 1 shows an automobile with a chipset in its license plate.

FIG. 1 shows an automobile with one M2M chip of a chipset in its license plate, and another M2M chip hidden in the frame of the automobile. The M2M chips (3) are in communication with each other. They make up a mated pair (11) of M2M chips. The two chips are also broadcasting, which puts them in communication with nearby aggregators (8). The M2M chips (3) are each attached to a polymer strip. Each M2M chip is attached to a polymer strip (4), and one chip is also attached to the license plate, by an epoxy base (10). The other M2M chip is embedded within the frame of the automobile. The M2M chips are small enough that they are hard to see. The M2M chips can also have different shapes.

Figure 2:
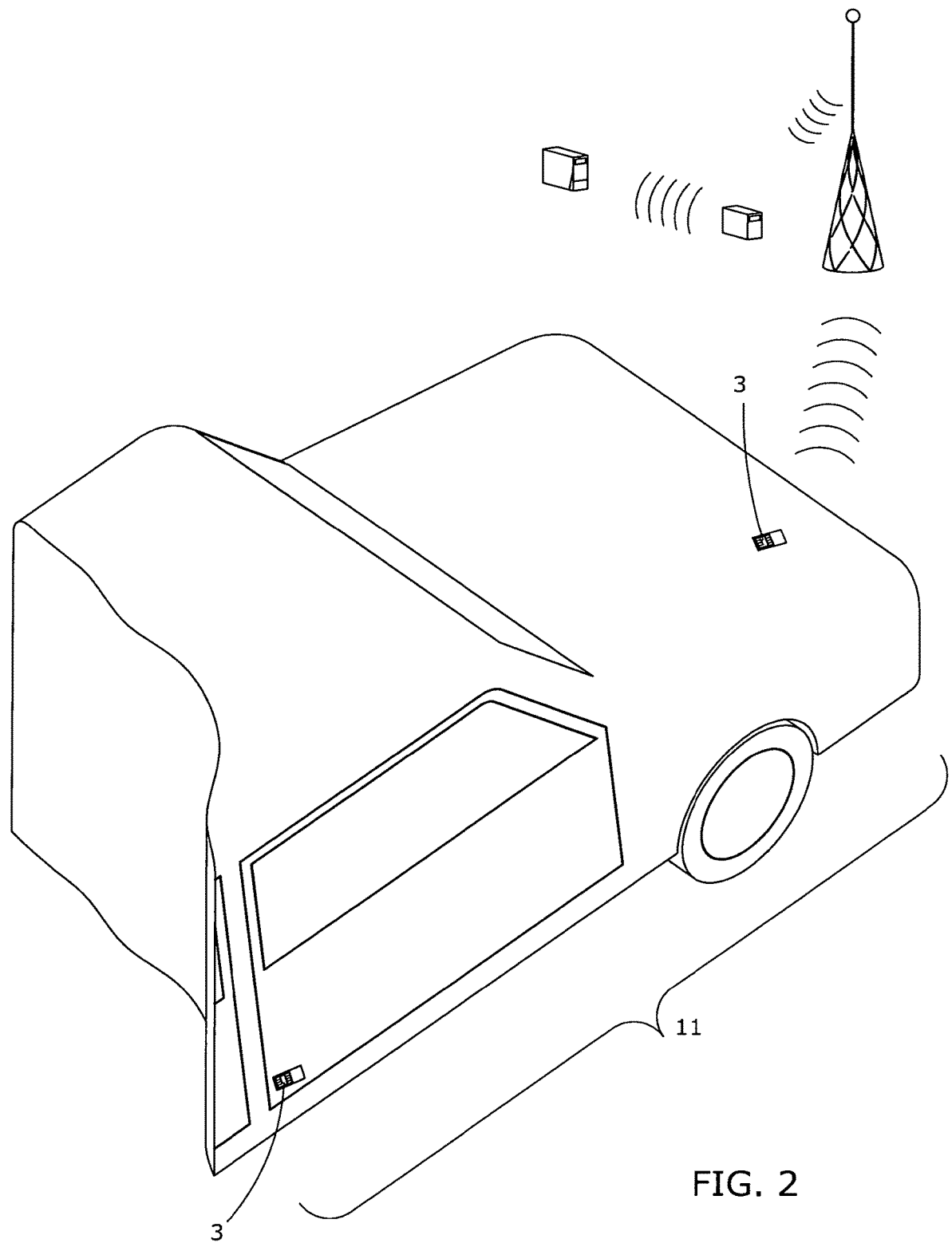
FIG. 2 shows an automobile with several M2M chips, hidden in the frame of the automobile.

FIG. 2 shows an automobile with a mated pair (11) of M2M chips, with both chips hidden in the frame of the automobile. The M2M Chips send information to each other. One M2M chip is embedded in the frame of the automobile, near the passenger windows. A second M2M chip is embedded near the engine of the automobile. The two M2M chips broadcast to each other, and to nearby aggregators (8). Each M2M chip can tell the location of the other M2M chip via the broadcast that it receives from the other M2M chip. If the M2M chips are moved further apart, both chips will notice this, because the signal each chip receives from the other chip will change. Triangulation and other methods can also be used by each M2M chip to detect whether the other M2M chip has moved further away. If someone attempts to dismantle the automobile, the M2M chips will be moved further apart. Each aggregator (8) within range receives a signal from the M2M chips. The location of the chips is secret, so they cannot be stolen or removed easily. If the M2M chips move substantially far apart, the M2M chips will each send a signal saying this, to the nearby aggregators (8). The aggregators will also be able to detect the location of the M2M chips through the signals being sent by the M2M chips (3). The aggregators (8) will then each send a signal to a gateway (9), which will access a cellular network via a gateway API, and then send a warning to any remote servers (7) nearby. The remote servers (7) can then each inform a central server that the automobile is being dismantled, and the location of the M2M chips, which will show the location of the parts of the automobile attached to the M2M chips. Law enforcement can then use this information to help locate the automobile.

Figure 3:
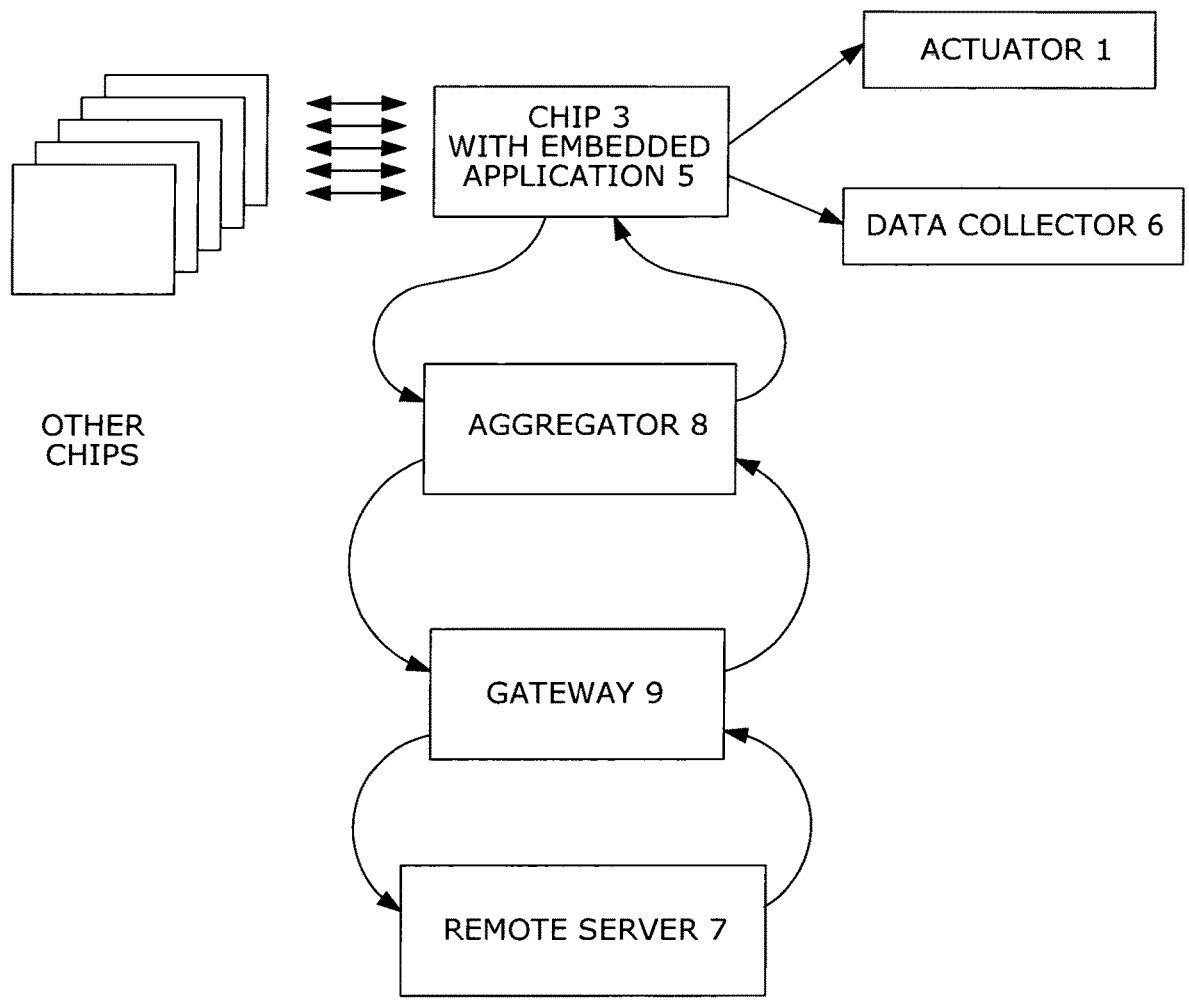
FIG. 3 shows a flow chart of the flow of information from the chipset to a central computer.

FIG. 3 shows a flow chart of the flow of information from the chipset to a central computer. The M2M chips (3) each control an actuator (1). The M2M chips (3) each have an embedded application (5). The M2M chips each transmit to each other, and also each transmit to a nearby data collector (6). The M2M chips (3) also transmit to nearby aggregators (8). Each aggregator then transmit to a gateway (9). The gateway (9) then transmit to a remote server (7), which is the central computer. The remote server then transmits information back to the aggregators, which then transmit information to the M2M chips (3). Each M2M chip (3) then commands the actuator it controls, based on the information that M2M chip has received from the aggregators.

Figure 4:
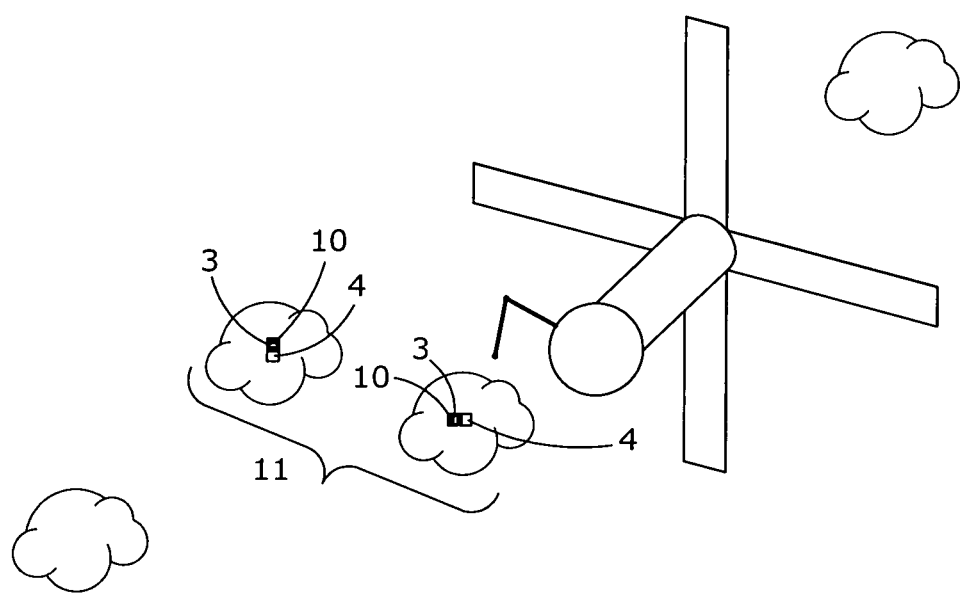
FIG. 4 shows an example of a chipset being attached to a piece of space debris in orbit around Earth.

FIG. 4 shows an example of a chipset being attached to pieces of space debris in orbit around Earth. The locator spacecraft is using a robotic arm to attach a mated pair (11) of M2M chips (3) to the pieces of space debris. The M2M chips are being fastened to the piece of space debris by an epoxy base (10).

Figure 5:
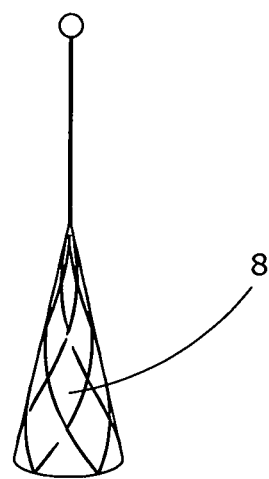
FIG. 5 shows a version of a chipset that is attached to a drone.
Figure 5:
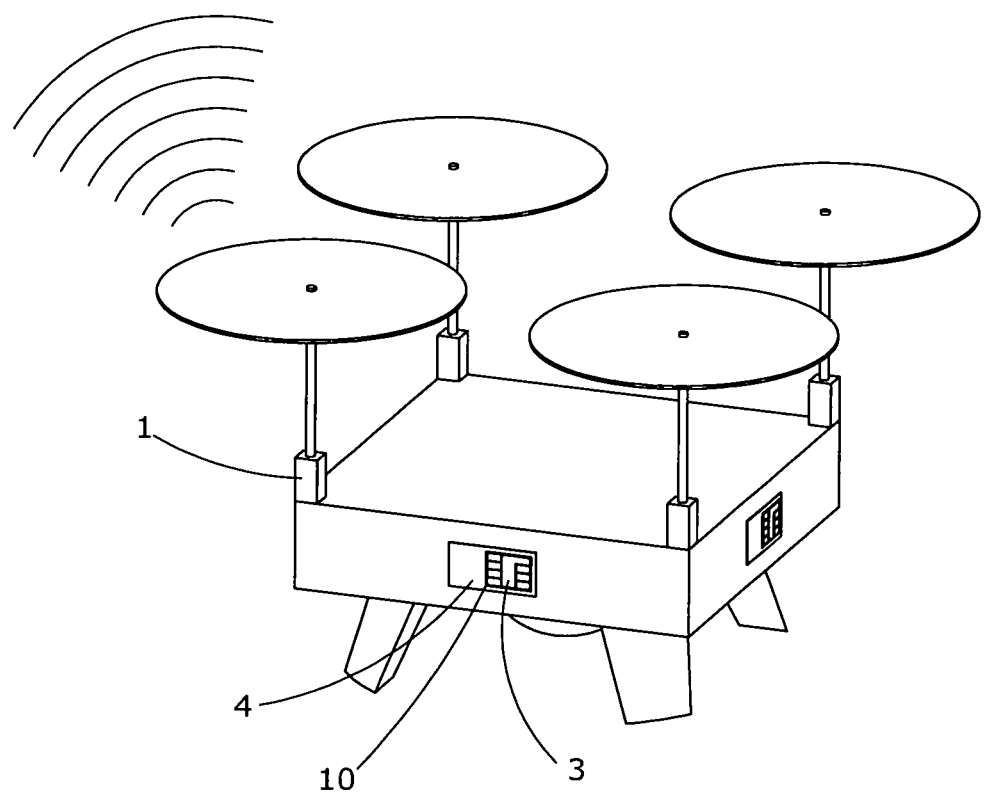

FIG. 5 shows a version of a chipset that is attached to a drone. Each M2M chip (3) controls an actuator (1), which can cause the drone to alter its flight path. The M2M chips (3) are each attached to a polymer strip. Each M2M chip is attached to a polymer strip (4), and to one of the walls of the drone, by an epoxy base.

Figure 6:
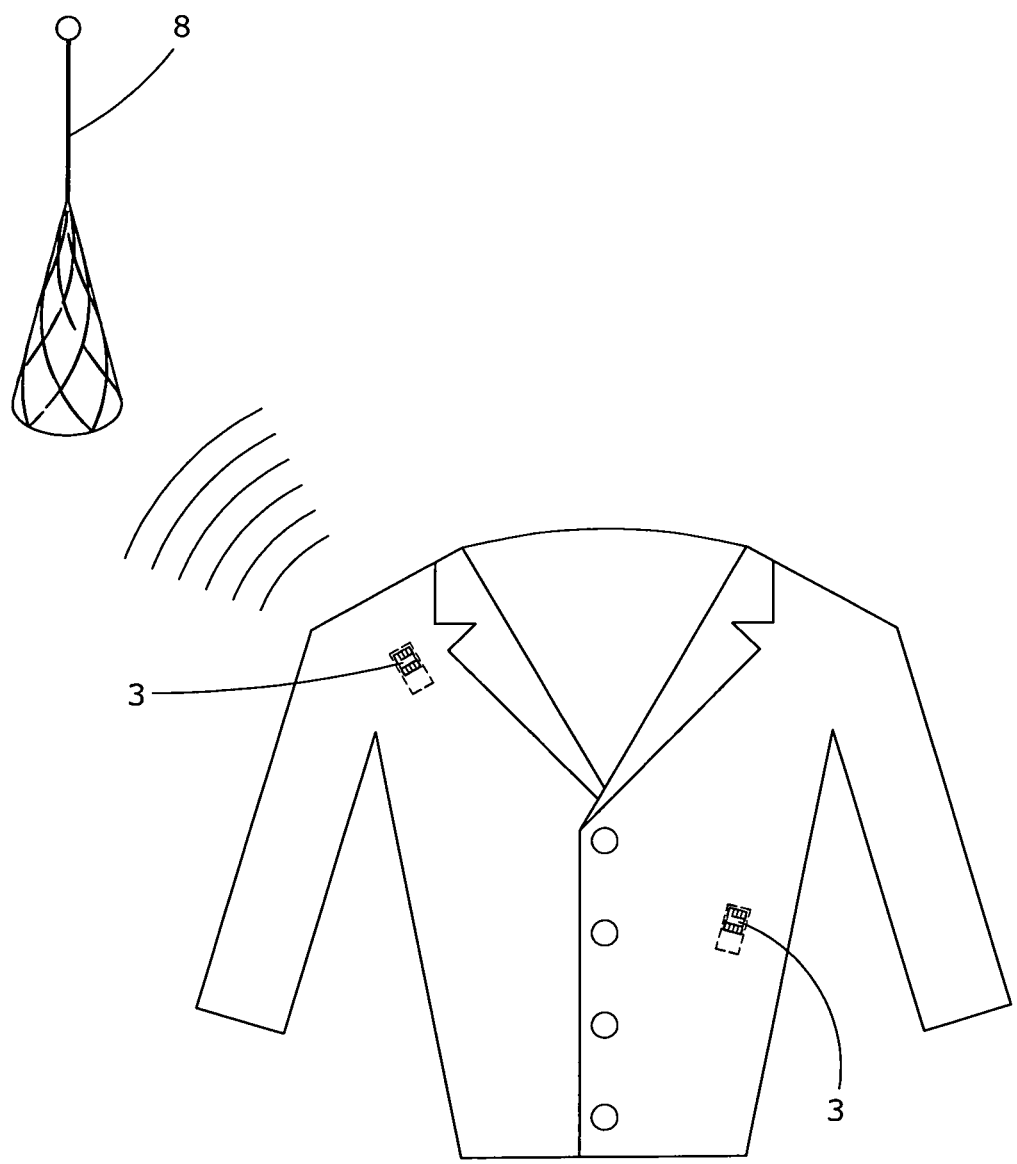
FIG. 6 shows a jacket, containing a chipset.

FIG. 6 shows a jacket, containing a chipset. The M2M chips (3) in the chipset are scattered throughout the jacket, and each M2M chip broadcasts to nearby aggregators (8).

Figure 7:
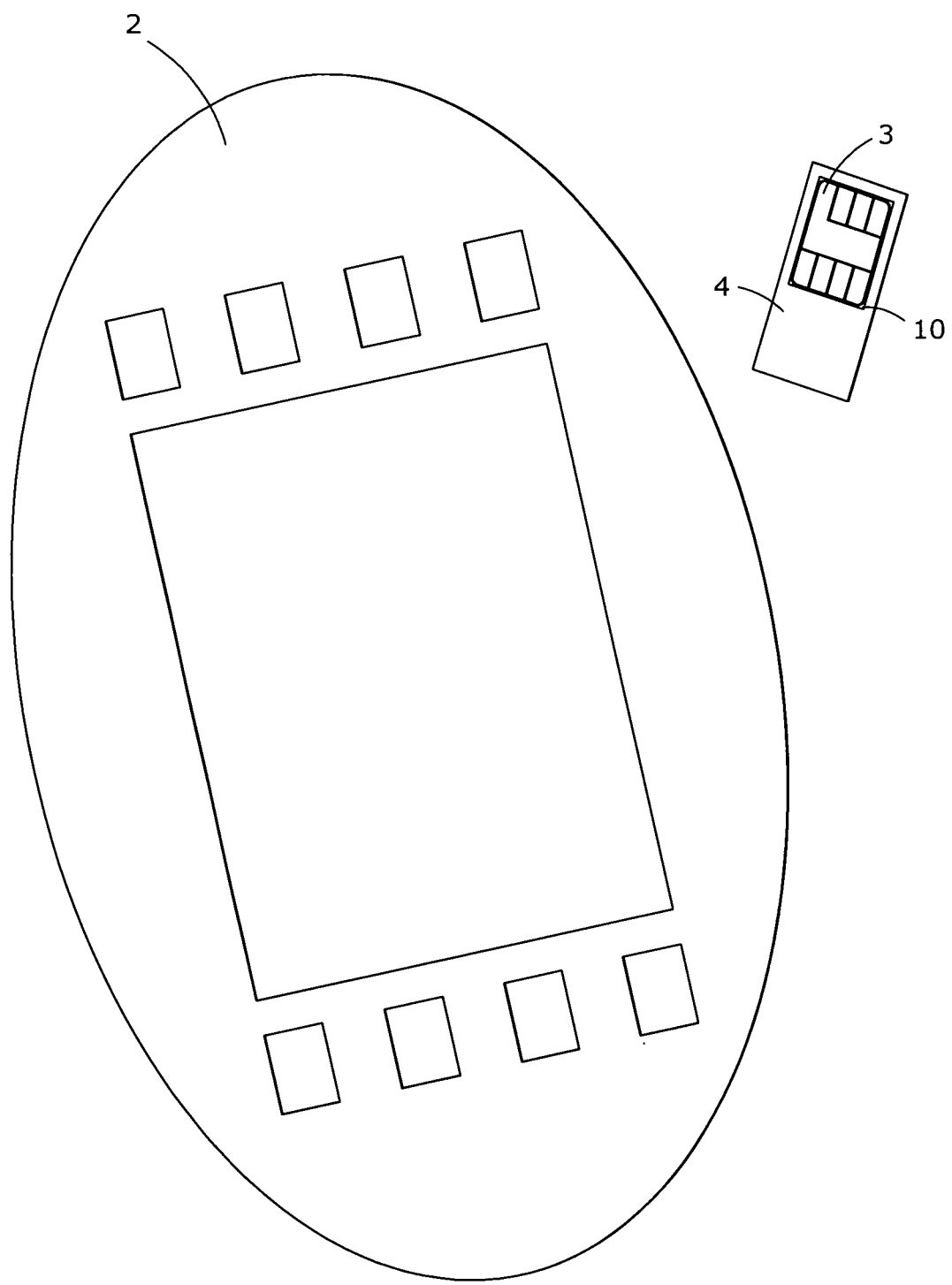
FIG. 7 shows a close-up picture of a chipset.

FIG. 7 shows a close-up picture of a chipset. The M2M chips in the chipset are attached to polymer strips (4), by an epoxy base (10). An RFID chip (2) is shown for comparison.

Figure 8:
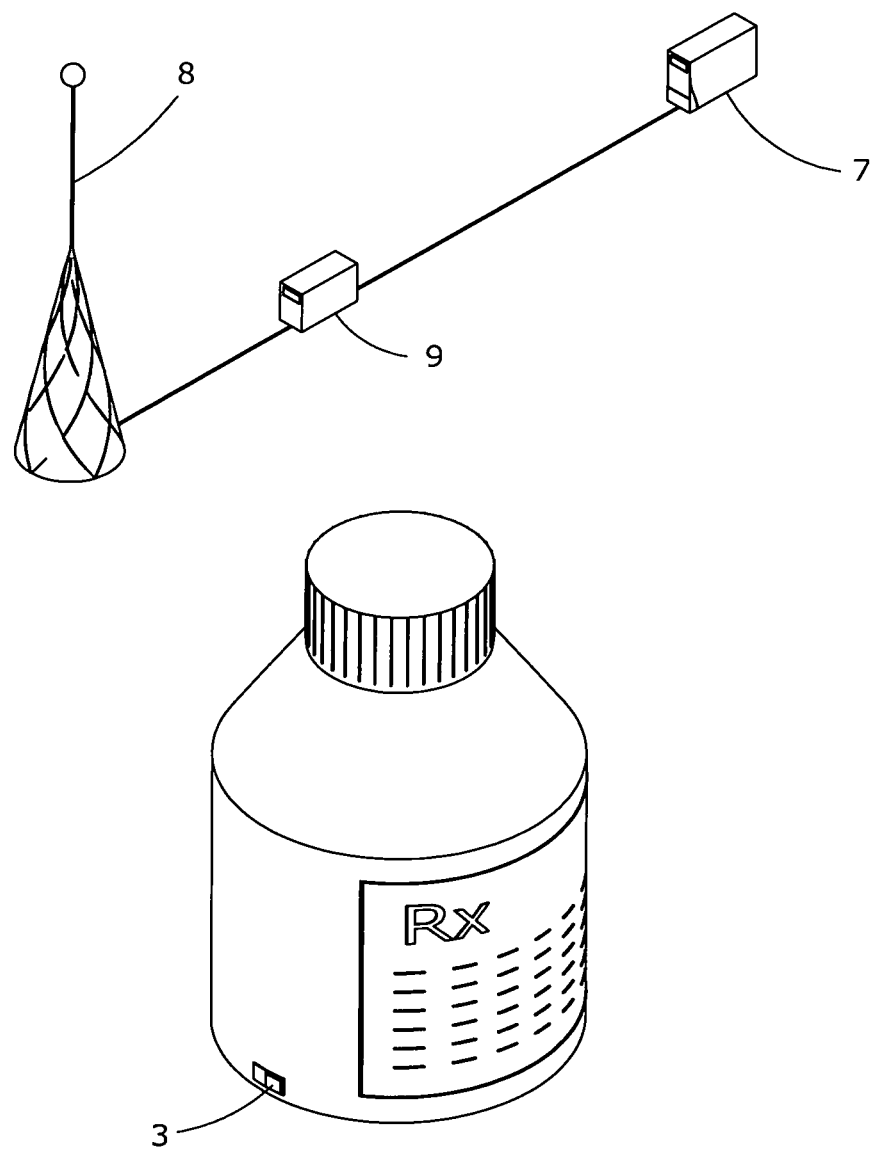
FIG. 8 shows another use of the invention.

FIG. 8 shows another use of the invention. A chipset is embedded in a bottle of expensive medicine, and the bottle is inside a pharmaceutical cabinet. An aggregator nearby monitors the broadcasts from all the chipsets, and transmits this information to a gateway, which transmits the information to a remote server. If the bottle is removed from the cabinet, the chipset will broadcast from a different point, and the aggregator will detect that the chipset has moved, and then pass this information on to the gateway, which will pass it on to the remote server. The remote server will then cause an alarm to sound elsewhere.

Figure 9:
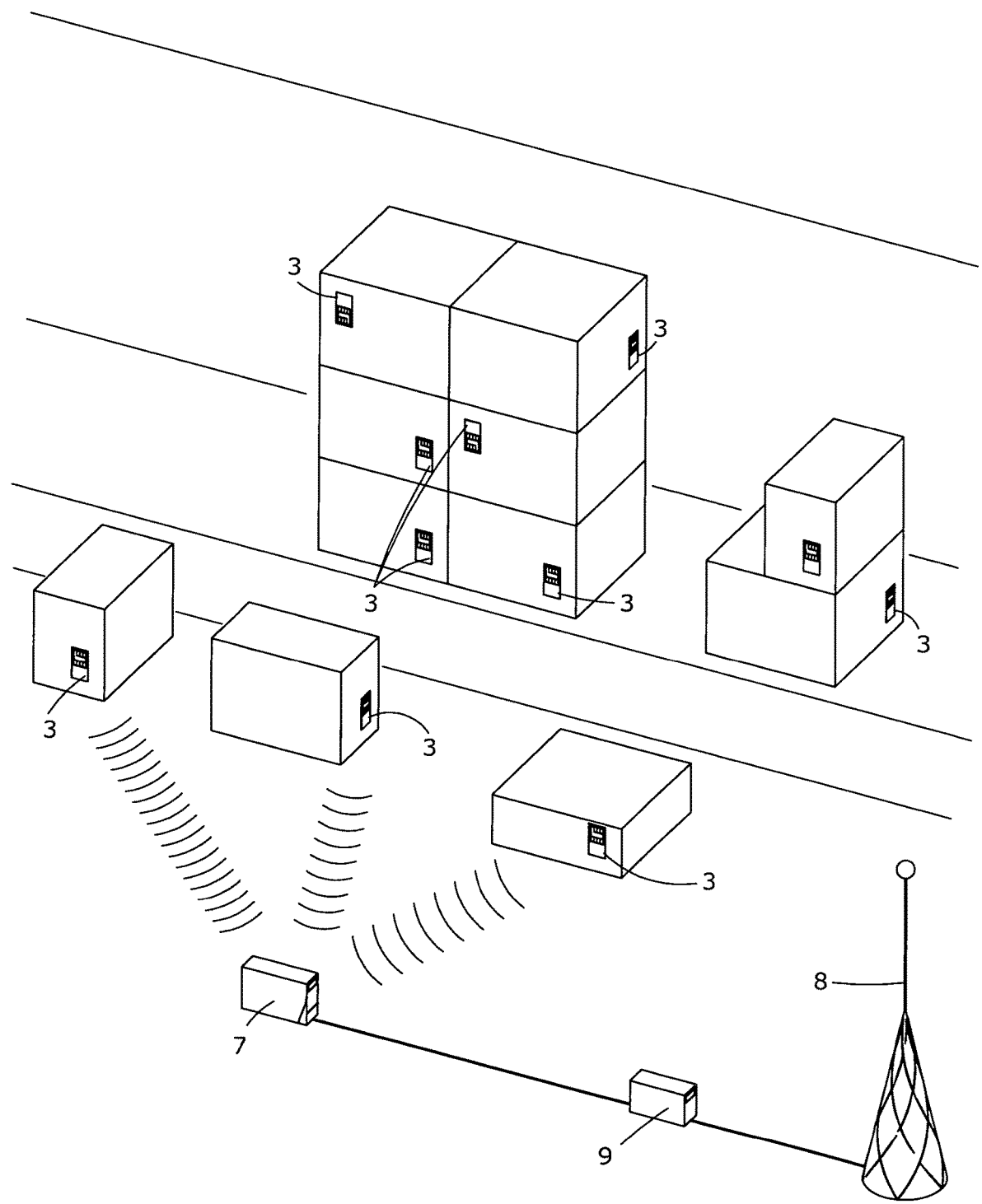
FIG. 9 shows a different use of the invention.

FIG. 9 shows a different use of the invention. Several containers are in a warehouse, and each contain a hidden "chipset" with a unique IP address. An aggregator in the warehouse monitors the broadcasts from all the chipsets, and transmits this information to a gateway, which transmits the information to a remote server. If one of the containers is removed, the chipset will broadcast from a different point, and the aggregator will detect that the chipset has moved, and then pass this information on to the gateway, which will pass it on to the remote server. The remote server will then cause an alarm to sound elsewhere in the warehouse. The M2M chips (3) here look different from the M2M chips in some other figures. This is to illustrate that M2M chips can have many different appearances.

Figure 10:
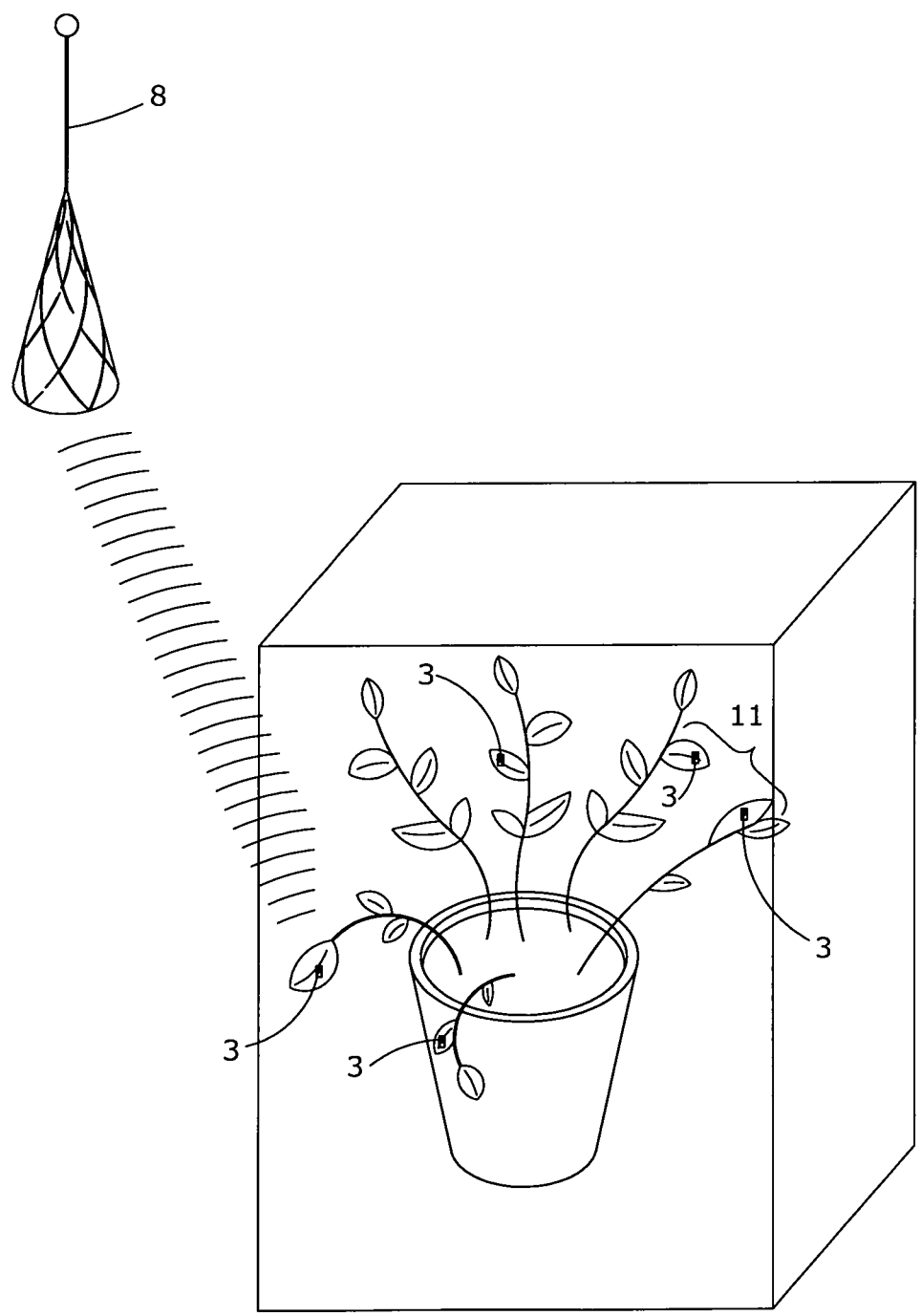
FIG. 10 shows a use of the invention to prevent theft of a plant.

FIG. 10 shows a use of the invention to prevent theft of a plant. The plant is in a glass case in a nursery. Several M2M chips (3) which are part of a chipset are placed on different leaves and stems of the plant, and these M2M chips (3) are broadcasting to each other. The chips are small and hard to see, therefore they are hard for thieves to find and remove. Some of the M2M chips are held within the folds of leaves. Each M2M chip broadcasts to the other M2M chips. Each M2M chip can therefore tell the position of the other M2M chips within the chipset via triangulation. The broadcasts of all M2M chips also can be detected by an aggregator (8), which is nearby and processes signals from the M2M chips placed on all the plants in the nursery.

If a thief steals one of the leaves or stems of the plant, which is attached to a chip, then the chip will be moved further away from the other plant, and then the other chips in the chipset will detect that this particular M2M chip has gone out of broadcasting range, or is broadcasting from much further away. The other M2M chips will then transmit an alarm to the aggregator, which will sound an alarm.

The aggregator, in this embodiment of the invention, can also detect when two M2M chips that are supposed to be close together (Such as two chips that are part of the same chipset and attached to the same plant), stop broadcasting from positions close together.

The aggregator can be programmed to independently sound an alarm if the chips that are supposed to be on different parts of the same plant are moved too far apart from each other.

The invention claimed is:

1. A method of tracking a drone, said method comprising the steps of;
   providing a mated group of at least two M2M chips, where either said M2M chips share the same unique IP address, or each M2M chip is programmed with its own unique IP address, said method further comprising embedding said M2M chips within said drone,
   said method further comprising programming each of said M2M chips with an embedded application, wherein the embedded application causes each of the M2M chips to continually broadcast telemetry from that M2M chip's IP address,
   and further comprising that said telemetry is received by aggregators;
   said method further comprising that said aggregators then either directly or indirectly transmit the information said aggregators have received to a remote server,
   said method further comprising providing a remote program,
   and said method further comprising that said remote program will analyze the results of said telemetry to triangulate the position of said drone;
   and said method further comprising that said remote program will indicate the position of said drone,
   said method further comprising that said remote program will transmit the location of said drone back to said aggregators, and said aggregators will transmit the location of said drone to said drone, and said drone will broadcast the location of said drone, allowing receivers that receive the broadcast of said drone's location to know the location of said drone.

2. The method of claim 1, further comprising that said mated group of M2M chips includes at least two M2M chips embedded in said drone, and at least one M2M chip embedded in a control device for said drone.

3. The method of claim 1, said method further comprising either that the location of said drone, broadcast by said drone, is received by a control device for said drone,
   or that the location of said drone, broadcast by said aggregators, is received by a control device for said drone.

4. The method of claim 1, said method further comprising that the M2M chips attached to said drone directly communicate with said aggregators, and each said aggregator directly communicates with the M2M chips attached to said drone and informs the M2M chips attached to said drone about its reading of the distance between itself and said drone;
   said method further comprising that said drone may triangulate the data that it is receiving from said aggregators and said drone may therefore determine its own position, and said drone may then broadcast its position, so that entities receiving said broadcast may learn the position of said drone.

5. A method of tracking automobiles and other vehicles, and the parts, including license plates, of said automobiles and other vehicles; said method utilizing a central program and a mated group of two or more M2M chips, where either said M2M chips have been programmed with the same IP address unique to said group of M2M chips or each M2M chip has been programmed with that M2M chip's own unique IP address, and said method further comprising that said M2M chips have all been programmed with an embedded application (5); where said embedded application (5) causes said M2M chips to continually emit a signal, said method further comprising the following;
- attaching all M2M chips to parts of the vehicle;
- causing said M2M chips to continually emit a signal;
- allowing said signal to be received by aggregators and transferred over the internet either directly or indirectly, to a central server which has been programmed with said central program;
- wherein said central program triangulates all signals that have been received from said M2M chips to determine the location of said M2M chips attached to said vehicle and the location of said vehicle.

6. The method of claim 5, where at least one M2M chip is attached to a license plate of the vehicle and any other M2M chips in said mated group are attached to one or more other parts of the vehicle.

7. The method of claim 5, further comprising that each M2M chip is attached to the license plate or another part of the automobile by thermoplastic welding.

8. The method of claim 5, said method further comprising
- said embedded program causes each said M2M chip in said mated group to monitor the signal from every other M2M chip in said mated group;
- said method further comprising that each M2M chip in said mated group can determine, based on the signal(s) said M2M chip receives from each other M2M chip in said mated group, the distance between said M2M chip and said other M2M chip;
- said method further comprising that said embedded program causes each said M2M chip in said mated group to send an alarm message to said aggregators when the distance between said M2M chip and any other M2M chip in said mated group increases by more than a specified fixed amount.

9. The method of claim 8, further comprising that said embedded program causes each said M2M chip in said mated group to monitor the signal from every other M2M chip in said mated group,
- said method further comprising that each M2M chip in said mated group can determine, based on the signal(s) said M2M chip receives from each other M2M chip in said mated group, the distance between said M2M chip and said other M2M chip;
- and said method further comprising that if the embedded program on any said M2M chip with said mated group detects, based on the signals that M2M chip receives from the other M2M chips within said mated group, that the distance between any two M2M chips in said mated group has increased to more than a specified fixed amount, then that M2M chip, or said aggregator, or said remote server, will cause an alarm to be activated.

10. The method of claim 8, said method further comprising that if the distance between any specific M2M chip within said mated group, and a specific aggregator, increases to more than a specified amount, then that M2M chip, or said aggregator, or said remote server, will cause an alarm to be activated.

11. The method of claim 5, further comprising that the M2M chips within the mated group of M2M chips use the IPv6 protocol.

12. The method of claim 5, further comprising that at least two M2M chips within the mated group of M2M chips are placed on different parts of the frame of the vehicle.

13. The method of claim 5, further comprising that the mated group of M2M chips embedded in the object is a mated pair of M2M chips.

14. The method of claim 5, further comprising utilizing at least two mated groups of M2M chips, each said mated group comprising two or more M2M chips, and said method further comprising that at least one M2M chip in a first mated group of M2M chips is attached to the front license plate of the vehicle, and any other M2M chips in said first mated group are attached to one or more other parts of the vehicle;
- and said method further comprising that at least one M2M chip in a second mated group of M2M chips is attached to the back license plate of the vehicle, and any other M2M chips in said second mated group are attached to one or more other parts of the vehicle.

* * * * *